A United States Patent Office 3,663,700
Patented May 16, 1972

3,663,700
THERAPEUTIC HYPOTENSIVE COMPOSITIONS COMPRISING CALCIUM SALTS OF 5-ALKYL-PICOLINIC ACIDS
Hamao Umezawa, 23, 4-chome, Toyotama-kita, Nerima-ku, Tokyo, Japan, and Toshiharu Nagatsu, 3610–81 Aza-Higashiyama, Nabeya-ueno-machi, Chigusa-ku, Nagoya-shi, Aichi-ken, Japan
No Drawing. Continuation-in-part of application Ser. No. 798,116, Feb. 10, 1969. This application Nov. 24, 1970, Ser. No. 92,176
Int. Cl. A61k 27/00
U.S. Cl. 424—266
3 Claims

ABSTRACT OF THE DISCLOSURE

Calcium 5-butylpicolinate and calcium 5-pentylpicolinate having hypotensive activity.

This application is a continuation-in-part of application Ser. No. 798,116, now abandoned.

This invention relates to new therapeutic compositions having hypotensive action. More particularly, the invention relates to the calcium salts of 5-butylpicolinic acid and 5-pentylpicolinic acid having hypotensive-activity and formulations thereof as therapeutically useful compositions.

The active compounds decreasing blood pressure in accordance with the present invention can be identified as 5-alkylpicolinic acids of the formula:

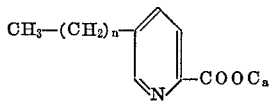

wherein $n$ is 3 or 4.

The compounds of this invention are active when administered orally, rectally or parenterally. In order to ensure proper absorption and favorable therapeutic effect, they are preferably incorporated in suitable conventional carriers such as refined sugar, lactose, starch, calcium carbonate, coconut oil, etc. These compounds, when injected subcutaneously or intramuscularly, may cause minor irritation in the injected area and the oral or the rectal use of these compounds is preferred over the subcutaneous or the intramuscular injection. Moreover, these compounds are effective when orally or rectally administered. In clinical use of these compounds, the recommendable dosage is 20 to 250 mg. of active drug per kg. of body weight 1 to 4 times per day. Thus, in preparing tablets, capsules, elixirs, suppositories or other dosage forms with pharmaceutical carriers, the formulation should preferably contain 20–250 mg. of active drug per dosage unit.

In the systematic screening studies of fungal compounds inhibiting dopamine β-hydroxylase, it was discovered by the present inventors that 5-butylpicolinic acid has the strong activity of inhibiting this enzyme reaction. This compound has been known as an antibiotic called fusaric acid. Dopamine β-hydroxylase is one of enzymes working for biosynthesis of norepinephrine, and 5-butylpicolinic acid was found by the present inventors to markedly reduce the epinephrine content in various tissues such as heart muscle, and adrenal glands. The decrease of epinephrine in brain is slight and this compound shows only very weak sedative effect. It was also discovered by the present inventors that this compound has a strong hypotensive action. On the basis of these discoveries, new therapeutic compositions comprising calcium 5-butylpicolinate as the hypotensive agent were invented. When not less than 20 mg./kg. of 5-butylpicolinic acid was intraperitoneally injected to rabbits, rats, cats or dogs, significant decrease of blood pressure was observed during about 30 minutes to 6 hours after the injection. When the dose was raised to 50 mg./kg., the blood pressure decrease was stronger and the lowered pressure was maintained for more than 24 hours. The oral administration of 30 mg./kg. of this compound showed almost the same effect as 20 mg./kg. of the intraperitoneal injection. $LD_{50}$ of this compound to mice was 100 mg./kg. by the intravenous injection and 80 mg./kg. by the intraperitoneal injection. The daily intramuscular injection or the oral administration of 40 mg./kg., 20 mg./kg. or 10 mg./kg. caused no toxic sign in dogs except vomiting in some dogs by oral administration. The death caused by the lethal dose was shown by the detailed examination of toxicities of this compound to be due to its blood pressure reducing effect, but not due to other kinds of biological activities.

5-butylpicolinic acid given orally to seven dogs at the dose of 20 mg./kg. caused vomiting in five dogs during 5–30 minutes after the administration. 5-pentylpicolinic acid at the dose of 20 mg./kg. also caused vomiting in four among seven dogs. However, the calcium salts of each of these acids at the same dose caused no vomiting and no toxic signs in seven dogs. Their calcium salts at dose of 200 mg./kg. three times a day also caused no vomiting and no toxic signs in 20 hypertensive patients.

The structure of the acids suggests that they are capable of chelating with metal ions. Though some salts of these acids have been published, there have been no reports on the preparation and properties of the calcium salts before this invention. The calcium salts of these acids were first prepared by the present invention. The calcium salts did not cause vomiting in dogs and were well tolerated. They showed the same therapeutic effect as the acids. $LD_{50}$ of the calcium salt was 125 mg./kg. both by the intraperitoneal and by the intramuscular injection. Though 5-butylpicolinic acid is irritating to stomach, the oral administration of the calcium salt does not cause vomiting in dogs. Fifty or one hundred mg./kg. of the calcium salt in the tablet or in the capsule four times daily were well taken by hypertensive patients without any toxic sign, and during 7 to 20 days of the administration, the blood pressure was gradually reduced. No toxic signs appeared during the daily administration for 90 days.

Before the present invention, there had been no observation of the hypotensive effect of 5-butylpicolinic acid and its homologues. The examination of the effects of 5-alkylpicolinic acids were first made by the present inventors. Preparing these compounds by chemical syntheses, their effects on dopamine β-hydroxylase and on blood pressure were examined. Dopamine β-hydroxylase was prepared from medulla of beef adrenals. The adrenals were homogenized in 0.02 M phosphate buffer of pH 6.5 containing sucrose at 8.5%. The ratio of the buffer to the adrenals was 10:1 in the weight. The homogenized solution was centrifuged at 700 g. for 10 minutes and the supernatant was centrifuged at 10,000 g. for one hour. The precipitate was collected and suspended in 0.02 M phosphate buffer of pH 6.5 containing sucrose at 8.5%. The weight of the buffer used was the same as that of the adrenals from which the enzyme was extracted. This enzyme solution could be kept more than several months in the frozen state without decrease in its activity. Generally, the enzyme solution was diluted 35 times with 0.2 M phosphate buffer of pH 6.5 containing sucrose at 8.5% and 0.1 ml. of the diluted solution was incorporated in the reaction mixture of the enzyme reaction. This concentration of the enzyme in the reaction mixture was enough to give the linear proceed of the reaction during 30 minutes of the enzyme reaction. The reaction mixture for the enzyme reaction consisted of 1 M potassium phosphate buffer of pH 6.5, 0.2 ml.; 1/10 M ascorbic acid, 0.1 ml.; 2/100 M fumaric acid in 0.2 N NaOH, 0.05 ml.; 4 mg./ml.

of catalase, 0.05 ml.; 1/10 M tyramine, 0.1 ml.; 1/10 M N-ethylmaleimide, 0.1 ml.; the enzyme solution, 0.1 ml.; the solution of the test material, 0.1 ml.; and the total volume was made 1.0 ml. with distilled water. After the reaction under shaking at 37° C. for 25 minues 0.2 ml. of 50% trichloracetic acid solution was added to stop the reaction and it was passed through a column (5 cm. length and 0.6 cm. diameter) of a sulfonic acid resin (Amberlite IR–CG–120) in H form. Ten ml. of distilled water was passed through the column and then the reaction product (octopamine) which was adsorbed on the column was eluted with 3.0 ml. of 4 N $NH_4OH$. The reaction product in the eluate was oxidized to p-hydroxybenzaldehyde by the addition of 0.3 ml. of 2.0% sodium periodate and after six minutes 0.3 ml. of 10% sodium metabisulfite was added. The optical density at 330 m. was determined. The homologues examined can be shown by the formula:

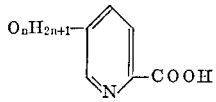

wherein $C_nH_{2n+1}$ means the straight hydrocarbon chain. The concentrations of the homologues for 50% inhibition of dopamine $\beta$-hydroxylase were as follows:

$n=0, 3.5 \times 10^{-6}$ M
$n=3, 3.0 \times 10^{-7}$ M
$n=6, 1.3 \times 10^{-7}$ M
$n=9, 2.3 \times 10^{-6}$ M
$n=1, 5.0 \times 10^{-6}$ M
$n=4, 7.5 \times 10^{-8}$ M
$n=7, 2.3 \times 10^{-7}$ M
$n=2, 2.2 \times 10^{-6}$ M
$n=5, 5.0 \times 10^{-8}$ M
$n=8, 6.8 \times 10^{-7}$ M When the homologues were injected into rabbits at 50 mg./kg. intraperitoneally, the percent of decrease of the blood pressure was as follows:

$n=0$, 12%
$n=5$, 43%
$n=1$, 20%
$n=6$, 22%
$n=2$, 27%
$n=7$, 44%
$n=3$, 31%
$n=8$, 37%
$n=4$, 40%
$n=9$, 12%

The toxicities of these compounds in terms of intraperitoneal $LD_{50}$ values (mg./kg. body weight) in mice were as follows:

$n=0$, 360
$n=5$, 70
$n=1$, 175
$n=6$, 85
$n=2$, 125
$n=7$, 45
$n=3$, 120
$n=8$, 62
$n=4$, 80
$n=9$, 75

As described above among the 5-alkylpicolinic acids, the effect of inhibiting dopamine $\beta$-hydroxylase and of reducing the blood pressure was found by the present inventors to be the strongest in 5-butyl and 5-pentylpicolinic acids. No biological activities have been observed with respect to 5-pentylpicolinic acid prior to this invention. 5-butyl and 5-pentylpicolinic acids were examined in detail for their hypotensive effect and the toxicities and almost identical results were confirmed. The calcium salt of 5-pentylpicolinic acid (calcium 5-pentylpicolinate) does not cause vomiting in dogs and the administration of 50 or 100 mg./kg. of the salt in tablet or in capsule form four times daily to hypertensive patients showed the same effect as calcium 5-butylpicolinate as already described.

New therapeutic compositions comprising calcium salts of 5-butylpicolinic acid and 5-pentylpicolinic acid causing no stomach irritation are provided by the present invention.

As described above, it was established by the present invention that 5-butyl and 5-pentylpicolinic acids inhibit dopamine $\beta$-hydroxylase, reduce norepinephrine in heart and muscle, reduce norepinephrine and epinephrine in adrenal glands, reduce blood pressure and have no toxicity except reducing the blood pressure, and although these acids themselves are irritating to the stomach, their calcium salts are not irritating and are useful for the treatment of hypertensive patients. The following examples will show how the active compounds of the present invention can be prepared, as well as the preparation of typically orally and rectally administrable formulations of the active compounds, but it is to be understood that these examples are given by way of illustration and not of limitation.

EXAMPLE 1

Giberrella fusikuroi was shake-cultured in 12 flasks containing 100 ml. of the following sterilized medium at 27° C. for two days: corn starch 1.0%, glucose 3.5%, peptone 0.5%, meat extract 0.5%, soybean meal 2.0%, NaCl 0.2%, $KH_2PO_4$ 0.05%, $MgSO_4 \cdot 7H_2O$ 0.05%, pH (6.0–6.2) a silicone resin 0.005 ml. The shake cultured broth (1.0 liter) was inoculated into 2,000 liters of the same medium placed in a stainless steel fermenter of 4,000 liters volume and the culture was continued at 28° C. under aeration of 1,000 liters per minute for 96 hours. The cultured broth was filtered and 1760 liters were obtained. The mycelium cake was washed with 265 liters of water. The filtrate and the washed water were combined and passed through a column of 180 liters of sulfonic acid resin (Amberlite IR–120) in H-form and thereafter 1200 liters of 2 N NaOH were passed. The active compound appeared in the eluate with 2 N NaOH and after neutralization with $H_2SO_4$ the active compound was absorbed on 20 kg. of active carbon. It was eluted with 800 liters of methanol containing 0.05 N hydrochloric acid. The methanol extract was neutralized with NaOH and evaporated under vacuum to 8 liters. The precipitate in the concentrated solution was collected, and after washing with 500 ml. of methanol, it was dissolved in hot methanol and crystallized, yielding 5.2 g. (M.P. 192° C., under decomposition. Calcd. for $C_{10}H_{13}NO_2 \cdot \frac{1}{2}Ca$ (percent): C, 60.28; H, 6.58; N, 7.03; O, 16.06; Ca, 10.04. Found (percent): C, 57.79; H, 6.46; N, 6.81; O, 15.65; Ca, 11.20) which was identified to be the calcium salt of 5-butylpicolinic acid by comparison with an authentic sample. After the precipitate had been removed, the concentrated solution was further evaporated to 6.5 liters under vacuum and the solid which appeared was collected. It was washed with butyl acetate, acetone, and hot water successively and the insoluble solid of 30 g. of calcium 5-butylpicolinate was obtained. Ten g. of the solid was dissolved in acetone-methyl-ethylketone—0.12 N HCl (1:2:6 in volume) and passed through 850 ml. of cation resin (XE–64) in H-form and eluted with the solvent of acetone-methylethylketone—0.12 N CHl (1:2:6). The eluate was cut into samples of 10 g. each and the active fractions (No. 58–91) were combined and evaporated under vacuum, yielding 3.613 g. of the solid. It was crystalized from hot butyl acetate of 250 ml., yielding 2.92 g. (very hygroscopic. Calcd. for $C_{10}H_{13}NO_2 \cdot HCl$ (percent): C, 55.65; H, 6.54; N, 6.50; O, 14.80; Cl, 16.44. Found (percent): C, 57.90; H, 6.81; N, 6.67; O, 14.50; Cl, 15.50) and identified to be hydrochloride of 5-butylpicolinic acid.

EXAMPLE 2

*Fusarium oxysporum* was shake-cultured in 7,500 ml. of a medium containing 3.0% sucrose, 5.0% peptone, 0.3% $NaNO_3$, 0.1% $K_2HPO_4$, 0.05% $MgSO_4 \cdot 7H_2O$, 0.05% KCl 0.001% $FeSO_4 \cdot 7H_2O$. Each flask contained 100 ml. of the medium. After 6 days of shaking the culture at 27–29° C., the cultured broth in 75 flasks were combined, filtered, made pH 2.0 with hydrochloric acid and extracted with 6,500 ml. of ethyl acetate. The ethyl acetate layer was separated and evaporated under vacuum. The oily residue of 8.79 g. was washed with 50 ml. of hexane and subjected to a silica gel column chromatography (2.6 cm. diameter and 50 cm. length). Benzene-chloroform in 1:1 in volume was employed for the elution. Passed solution from the column was fracttionated into fractions of 15 g. The fractions No. 177 to 181 were combined and after evaporation under vacuum, the residue was crystallized from carbon tetrachloride yielding 204 mg. crystals. These crystals (M.P. 102.5–103.5° C. Calcd. for $C_{10}H_{13}NO_2$ (percent): C, 67.02; H, 7.31; N, 7.82; O, 17.86. Found (percent): C, 66.46; H, 7.29; N, 7.95; A, 17.08) were identified as 5-butylpicolinic acid by comparison of the melting point, the ultraviolet absorption and the infrared spectrum with an authentic sample of 5-butylpicolinic acid.

EXAMPLE 3

A stirred mixture of 6.0 g. of 5-butyl-2-picoline, 50 ml. of pyridine, and 7.3 g. of selenium dioxide was refluxed for 3.5 hours, clarified, evaporated in vacuo, and the residue dissolved in 20 ml. of water. After decolorization with active carbon, the solution was concentrated, extracted with ethyl acetate, and the extract chromatographed over 50 g. silica gel with ethyl acetate to give 3.0 g. of 5-butylpicolinic acid (fusaric acid), melting at 99–100° C. after recrystallization from ethyl acetate-hexane.

EXAMPLE 4

By a method similar to that described in Example 3, 5.0 g. of 5-pentyl-2-picoline was oxidized with 6.1 g. of selenium dioxide in pyridine and the product was recrystallized from isopropyl ether to give 3.3 g. of 5-pentylpicolinic acid, melting at 104–105° C.

EXAMPLE 5

5-butylpicolinic acid (150 mg.) was dissolved in 3 ml. of water at 50° C. and the hot solution was treated with 100 mg. of calcium chloride in 1 ml. of water and adjusted to pH 6.8 with 3% aqueous ammonia to deposit 160 mg. of the calcium salt as fine needles.

EXAMPLE 6

A solution of 150 mg. of 5-pentylpicolinic acid in 3 ml. of water and 0.5 ml. of of methanol was treated with 10% aqueous calcium chloride and brought to pH 6.8 with dilute ammonia water to deposit 170 mg. of the calcium salt.

EXAMPLE 7.—TABLETS

A granulation was prepared of

| | Parts |
|---|---|
| Lactose | 68 |
| Starch | 32 |
| Water.[1] | |

[1] A sufficient quantity.

The granulation is dried and screened.

| | G. |
|---|---|
| Calcium 5-butylpicolinate | 50 |
| Lactose granulation | 197.5 |
| Magnesium stearate | 2.5 | are mixed well together and compressed into tablets weighing 250 mg. and contaning 50 mg. of the salt.

EXAMPLE 8.—CAPSULES

A mixture is prepared, containing equal parts by weight of calcium 5-pentylpicolinate and lactose. The mixture is then filled, 200 mg. per capsule, into standard clear gelatin capsules and after closing, the capsules are dusted with talc or corn starch. The resulting capsules contain 100 mg. of the salt per dosage unit.

EXAMPLE 9.—SUPPOSITORIES

A solution is made by heating to about 40° C. of

| | G. |
|---|---|
| Calcium 5-butylpicolinate | 10 |
| Polyethylene glycol (average mol. wt. 600) | 17 |
| Polyethylene glycol (average mol. wt. 1000) | 33 | and the solution is mixed with

| | G. |
|---|---|
| Sorbitan monooleate | 2.7 |
| Polyoxyethylene sorbitan monooleate | 2.7 |
| Hydrogenated coconut oil (melted) | 233.0 |
| Water | 1.6 |

The mixture is poured into molds, giving suppositories weighing 3 g. and containing 100 mg. of the calcium salt.

EXAMPLE 10.—ELIXIR

Mixture 5 mg./ml. A vehicle solution is prepared by heating of

| | G. |
|---|---|
| Sodium carboxylmethyl-cellulose | 7 |
| Sorbitol solution (N.F.) | 775 |
| Methylparaben | 1 |
| Water | 324 |

After cooling to room temperature

Raspberry flavor—35 g.

is added and the vehicle is mixed with

| | G. |
|---|---|
| Calcium 5-butylpicolinate | 5 |
| Polyoxyethylene sorbitan monooleate | 0.5 | and the mixture is homogenized in a homogenizer yielding an elixir containing 5 mg./ml. of the calcium salt. A dosage unit of 15 ml. (1 tablespoon) thus contains 75 mg. of the calcium salt.

In the foregoing Examples 7 to 10, it will be understood that calcium 5-butylpicolinate or calcium 5-pentylpicolinate can be substituted for one another as the active component, and that the amount of active component can be suitably varied within the range of 20 to 250 mg. per dosage unit.

The claimed compounds were tested in two groups of hypertensive patients and two normotensive patients of old age. The first group of six hypertensive patients consisted of three males and three females (Table I). Administration of the calcium salt of fusaric acid had been started at June 1969 in five cases and at August 1969 in one case (Case No. 6). The blood pressures of these patients had been measured once a week, as a rule, during the control period of six months prior to the beginning of the trial period of six months. Four of six cases had been treated with reserpine and/or a thiazide derivative during the control period and these drugs had been continued in the same dose during the trial period. The casual blood pressure was measured at lying position on their beds every morning during four months and every other morning during the succeeding two months of the trial period. The starting daily dose of the calcium salt was 150 mg. for all patients; 50 mg. in one capsule after each meal. The daily dose had been increased up to 600 mg. (12 capsules) according to the hypotensive responses of the patients.

The second group consisted of ten hypertensive patients; four males and six females (Table II). Seven cases had been treated with other antihypertensive drugs (reserpine, thiazide derivatives and hydralazine) during the control period of six months and five of these seven cases had continued to receive these drugs during the trial period of six months. The patients of this second group consisted in part of the double blind cross-over trial, which was undertaken throughout twelve weeks prior to the trial period in these patients. Thus, in the second hypertensive group, each six months of control and of trial period were separated by this twelve week period. The frequencies and the methods of measurement of the blood pressure were almost the same as the first group. The starting daily doses of the calcium salt in the patients of this group at the beginning of the trial period ranged from 450 mg. to 600 mg., and the doses had been changed between 150 mg. and 600 mg. per day, according to the hypotensive responses and/or to the other conditions of the patients.

Two normotensive patients received the calcium salt administration of four and twelve weeks' duration respectively, the purpose of which was to test the hypotensive effect of this agent in normotensive subjects. One patient (Case No. N-1) received up to 300 mg., and another patient (Case No. N-2) received up to 600 mg. of calcium salt per day, respectively.

Determination of the hypotensive effect was made by comparing the blood pressures in the control period and those in the trial period of each six months, in the first and second groups of hypertensive patients. The means, standard deviations and standard errors for the systolic, diastolic and mean blood pressures were calculated. The one method was to compare the means of these three pressures during the control and trial period by means of their standard errors. Another method was to set the degrees of hypotensive responses for these three pressures and the response of each patient was compared with these standard degrees. The cause of both systolic and diastolic pressures of all cases are illustrated in the following tables and figures.

Laboratory findings during the trial period were tabled for each hypertensive patient; blood chemistry, hematological findings, urinalysis, occult blood in feces, chest X-ray findings and electrocardiographic findings.

TABLE I

Blood pressure, organ findings and severity index of the hypertensive patients of the first group administered with the calcium salt.

| Case | | | Blood pressure [2] | | | Symptoms, signs and findings of main organs | | | | Renal | | | Ocular fundi [3] | Total severity index [4] | Other antihypertensive drugs [5] | |
|---|---|---|---|---|---|---|---|---|---|---|---|---|---|---|---|---|
| | | | | | | | Cardiac | | | | | | | | | |
| No. | Age [1] | Sex | Systolic | Diastolic | Mean | Cerebral | CTR | Electrocardiogram | Symptoms of ischemia | BUN | Protein | Sediment | | | Before Ca salt | After Ca salt |
| 1 | 73 | M | 168 | 107 | 125 | None (1) | 51.2 | Left axis deviation | Exertional dyspnea. | 25.2 | (±) | Few red blood cells. | H-1, S-3 | | None | Hydrochlorothiazide 100 mg. (5 weeks) and TC-thiazide; 4-6 mg. for diuretics. |
| 2 | 72 | M | 147 | 90 | 109 | Right hemiparesis (0) | 57.2 | Within normal limits | None (II) [6] (2) | 30.8 | (±) | Few red blood cells. | Not examined. | (8) | Reserpine 0.8 mg. | Reserpine 0.8 mg. |
| 3 | 72 | M | 182 | 89 | 120 | Parkinsonism and dysarthria. (4) | 59.2 | LVH and left axis deviation. | None (1) (2) | 22.0 | (−) | None | H-1, S-2. (?) | (9+?) | Reserpine 1.0 mg. | Reserpine 1.0 mg. |
| 4 | 75 | F | 214 | 94 | 134 | Slight dizziness and headache. (3) | 69.0 | LVH, coronary insufficiency and 1st degree of A-V block. | Exertional dyspnea. (1) (2) | 17.7 | (±) | None | H-1, S-2. (2) | (10) | Reserpine 0.8 mg. (9 weeks) 0.5 mg. (6 weeks) and TC-thiazide 4 mg. (15 weeks). | Reserpine 0.5 mg. and TC-thiazide 4 mg. |
| 5 | 71 | F | 196 | 91 | 126 | Left hemiparesis. (1) (2) | 45.9 | LVH and coronary insufficiency. | None (II) (3) | 33.4 | (±) | None | H-1, S-2. (2) | (10) | Reserpine 1.0 mg. | Reserpine 1.0 mg. |
| 6 | 84 | F | 176 | 75 | 109 | Orthostatic dizziness, headache and tinnitus. (4) (1) | 56.5 | LVH | Exertional dyspnea. (1) (2) (II) (2) (0) (1) | 22.0 | (±) | Few red blood cells. | H-1, S-3. (2) | (12) (7) | None | None. |

NOTE.—Abbreviations used in Table I and II: M=Male, F=Female, CTR=Cardiothoracic ratio in percent, LVH=Left ventricular hypertrophy, BUN=Blood urea nitrogen in mg./dl., Protein in Urinalysis; (±)=Trace and (+)=Slightly positive, TC-thiazide=Trichlormethiazide.
[1] Age; in years at the starting of the trial period.
[2] Blood pressure; the means throughout the control period of six months of the systolic, diastolic and mean blood pressures.
[3] Ocular Fundi; according to the classification by Scheie (1953).
[4] Total Severity Index; calculated summing up the severity indices for blood pressure and for main organs (cerebral, cardiac, renal and ocular fundi), which were shown in parenthesis under corresponding items. (Ref.: "On a Tentative Plan of the Standards for Diagnosis and Treatment of the Hypertensive Patients" by "A Research Group of Hypertension" of Departments of Internal Medicine, University of Tokyo; Saishin Igaku 22: 2027, 1967 (in Japanese)).
[5] Other hypertensive drugs; shown in daily dose.
[6] Classification of the functional state of the heart by New York Heart Association.

TABLE II

Blood pressure, organ findings and severity index of the hypertensive patients of the second group administered with calcium salt

| Case | | | Blood pressure [2] | | | | Symptoms, signs and findings of main organs | | | | | | | Total severity index [4] | Other antihypertensive drugs [5] | |
|---|---|---|---|---|---|---|---|---|---|---|---|---|---|---|---|---|
| | | | | | | | | Cardiac | | | Renal—urinalysis | | | | | |
| No. | Age [1] | Sex | Systolic | Diastolic | Mean | Cerebral | | CTR | Electrocardiogram | Symptoms of ischemia | BUN | Protein | Sediment | Ocular fundi [3] | | Before Ca salt | After Ca salt |
| 1A | 72 | M | 229 | 113 | 151 | Pseudobulbar palsy, parkinsonism and slight headache. | | 59.0 | LVH, myocardial infarction and supraventricular extrasystoles. | Exertional dyspnea. | 28.0 | (+) | None | H-2, S-2 | | TC-thiazide 6 mg | Reserpine 0.8 mg. |
| 1B | 72 | M | 181 | 103 | (3) 128 | None | (3) | 55.8 | LVH and atrial fibrillation. | (II) [6] (3) Exertional dyspnea. | 16.3 | (±) | None | (4) H-1, S-1 | (2) (15) | TC-thiazide 2 mg | TC-thiazide 2 mg. for 3 months. |
| 2A | 73 | F | 173 | 71 | (2) 106 | Parkinsonism and orthostatic dizziness. | (0) | 62.2 | LVH and 1st degree of A-V block. | (II) (2) None | 18.2 | (+) | Few red blood cells. | (1) H-1, S-1 | (1) (6) | None | None. |
| 2B | 75 | F | 193 | 86 | (0) 122 | Orthostatic dizziness | (3) | 52.3 | Myocardial ischemia | (I) (3) None | 21.8 | (±) | Few red blood cells. | (2) H-1, S-2 | (1) (9) | Reserpine 0.4 mg. for 4 months. | Do. |
| 3A | 78 | F | 182 | 103 | (1) 129 | None | (1) | 56.2 | LVH and ventricular extrasystoles. | (I) (2) None | 10.8 | (±) | None | (2) H-1, S-1 | (1) (7) | TC-thiazide 4 mg | TC-thiazide 4 mg. |
| 3B | 85 | F | 195 | 89 | (2) 124 | Dizziness and heavy headedness. | (0) | 64.5 | LVH and myocardial ischemia. | (I) (2) None | 15.4 | (±) | None | (1) H-1, S-1 | (1) (6) | Hydralazine 100 mg. and TC-thiazide 6 mg. (4 weeks), succeeded by Reserpine 0.6 mg. | None. |
| 4A | 59 | M | 155 | 110 | (1) 125 | Right hemiparesis with motor aphasis. | (1) | 64.0 | Myocardial ischemia and left axis deviation. | (I) (3) Exertional dyspnea. | 18.2 | (±) | None | (1) H-1, S-2 | (1) (7) | Reserpine 0.6 mg. succeeded by hydrochlorothiazide 50 mg. | Hydrochlorothiazide 50 mg. |
| 4B | 66 | M | 147 | 91 | (1) 109 | Sequelae of subarachnoideal. | (4) | 54.5 | LVH and myocardial ischemia. | (II) (3) None | 15.4 | (±) | Few red blood cells. | (2) H-0, S-0 | (2) (12) | TC-thiazide 2 mg | TC-thiazide 2 mg. |
| 5A | 73 | F | 166 | 94 | (0) 118 | Tinnitus | (3) | 58.4 | LVH and incomplete right bundle branch block. | (I) (2) None | 21.6 | (±) | Few red blood cells. | (1) H-1, S-2 | (0) (6) | None | None. |
| 5B | 73 | F | 156 | 89 | (1) 112 (1) | Dizziness and heavy headedness. | (1) (1) | 55.4 | Non-specific change in the ST segment. | (I) (2) None (II) (1) | 16.4 | (±) | None | (2) H-0, S-2 | (1) (1) (7) (5) | do | Do. |

See footnotes at end of Table I.

TABLE III

Comparison Between the Means of the Systolic, Diastolic and Mean Blood Pressures During the Control Period and Those During the Trial Period in Hypertensive Patients of the First Group

*[Graphical chart showing Blood Pressure (mmHg) on vertical axis from 100 to 200, with Case Nos. 1–6 each having Control (C) and Trial (T) measurement points with standard error bars, displaying Systolic, Diastolic, and Mean blood pressures. C: Control Period; T: Trial Period.]*

TABLE IV

| | No. 1 | | No. 2 | | No. 3 | | No. 4 | | No. 5 | | No. 6 | |
|---|---|---|---|---|---|---|---|---|---|---|---|---|
| | C | T | C | T | C | T | C | T | C | T | C | T |
| Number of measurement | 23 | 122 | 23 | 125 | 23 | 123 | 26 | 123 | 27 | 122 | 31 | 146 |
| Systolic blood pressure (mm. Hg) Mean | 168 | 137 | 148 | 144 | 182 | 166 | 214 | 177 | 196 | 175 | 176 | 168 |
| Standard deviation | 19.4 | 15.9 | 16.3 | 12.1 | 17.1 | 17.3 | 20.9 | 16.2 | 15.8 | 12.6 | 13.2 | 17.3 |
| Standard error | 4.1 | 1.4 | 3.2 | 1.1 | 3.6 | 1.6 | 4.1 | 1.5 | 3.0 | 1.1 | 2.4 | 1.4 |
| Diastolic blood pressure (mm. Hg) Mean | 107 | 87 | 90 | 83 | 89 | 77 | 94 | 75 | 91 | 75 | 75 | 72 |
| Standard deviation | 10.9 | 9.3 | 9.0 | 8.1 | 8.6 | 6.0 | 13.0 | 9.5 | 10.6 | 5.5 | 8.6 | 7.2 |
| Standard error | 2.3 | 0.8 | 1.9 | 0.7 | 1.8 | 0.6 | 2.6 | 0.9 | 2.0 | 0.5 | 1.5 | 0.6 |
| Mean blood pressure (mm. Hg) Mean | 125 | 104 | 109 | 103 | 120 | 107 | 134 | 109 | 126 | 108 | 109 | 104 |
| Standard deviation | 12.1 | 11.1 | 11.1 | 9.3 | 10.6 | 8.9 | 14.5 | 10.7 | 9.2 | 9.5 | 9.4 | 9.5 |
| Standard error | 2.5 | 1.0 | 2.3 | 0.8 | 2.2 | 0.8 | 2.8 | 1.0 | 1.8 | 0.9 | 1.7 | 0.8 |
| Comparison between control and trial periods (mm. Hg) Systolic blood pressure | | −31 | | −4 | | −16 | | −37 | | −21 | | −8 |
| Diastolic blood pressure | | −20 | | −7 | | −12 | | −19 | | −16 | | −3 |
| Mean blood pressure | | −21 | | −6 | | −13 | | −25 | | −18 | | −5 |
| Other antihypertensive drugs | None | [1]H-Th, [2]TC-Th | [3]R[4] (0.8) | R (0.8) | R (1.0) | R (1.0) | R (0.8); TC-Th (4) | R (0.5); TC-Th (4) | R (1.0) | R (1.0) | None | None |

[1] H-Th; Hydrochlorothiazide.  [2] TC-Th; Trichlormethiazide.  [3] R; Reserpine.  [4] Number in parenthesis, daily dose in mg.

TABLE V

Comparison Between the Means of the Systolic, Diastolic and Mean Blood Pressures During the Control Period and Those During the Trial Period in Hypertensive Patients of the Second Group

TABLE VI

| | | No. 1A C | No. 1A T | No. 2A C | No. 2A T | No. 3A C | No. 3A T | No. 4A C | No. 4A T | No. 5A C | No. 5A T |
|---|---|---|---|---|---|---|---|---|---|---|---|
| Number of measurement | | 32 | 98 | 32 | 97 | 32 | 99 | 32 | 99 | 32 | 99 |
| Systolic blood pressure (mm.Hg.) | Mean | 229 | 179 | 181 | 160 | 173 | 164 | 193 | 147 | 182 | 178 |
| | Standard deviation | 15.4 | 15.6 | 16.2 | 12.5 | 15.1 | 15.5 | 16.6 | 15.6 | 11.3 | 13.1 |
| | Standard error | 2.7 | 1.6 | 2.9 | 1.3 | 2.7 | 1.6 | 2.9 | 1.6 | 2.0 | 1.3 |
| Diastolic blood pressure (mm.Hg.) | Mean | 113 | 88 | 103 | 99 | 71 | 70 | 86 | 74 | 103 | 99 |
| | Standard deviation | 9.1 | 8.1 | 7.5 | 8.1 | 8.5 | 7.0 | 8.0 | 9.2 | 7.4 | 7.4 |
| | Standard error | 1.6 | 0.8 | 1.3 | 0.8 | 1.5 | 0.7 | 1.4 | 0.9 | 1.3 | 0.7 |
| Mean blood pressure (mm.Hg.) | Mean | 151 | 118 | 128 | 119 | 106 | 101 | 122 | 98 | 129 | 126 |
| | Standard deviation | 9.5 | 9.6 | 9.1 | 8.7 | 9.8 | 9.1 | 10.1 | 10.4 | 7.9 | 8.0 |
| | Standard error | 1.7 | 1.0 | 1.6 | 0.9 | 1.7 | 0.9 | 1.8 | 1.0 | 1.4 | 0.8 |
| Comparison between control and trial periods (mm.Hg). | Systolic blood pressure | −50 | | −21 | | −9 | | −46 | | −4 | |
| | Diastolic blood pressure | −25 | | −4 | | −1 | | −12 | | −4 | |
| | Mean blood pressure | −33 | | −9 | | −5 | | −24 | | −3 | |
| Other antihypertensive drugs. | | [1] TC-Th(6) | [2] R(0.8) | TC-Th(2) | TC-Th(2) | None | None | R(0.4) | None | TC-Th(4) | TC-TH(4) |

| | | No. 1B C | No. 1B T | No. 2B C | No. 2B T | No. 3B C | No. 3B T | No. 4B C | No. 4B T | No. 5B C | No. 5B T |
|---|---|---|---|---|---|---|---|---|---|---|---|
| Number of measurement | | 31 | 99 | 30 | 97 | 31 | 97 | 32 | 99 | 32 | 99 |
| Systolic blood pressure (mm.Hg). | Mean | 195 | 173 | 155 | 118 | 147 | 142 | 166 | 130 | 156 | 149 |
| | Standard deviation | 16.1 | 18.1 | 14.0 | 11.4 | 7.3 | 11.9 | 14.1 | 20.7 | 12.6 | 11.4 |
| | Standard error | 2.9 | 1.8 | 2.6 | 1.2 | 1.3 | 1.2 | 2.5 | 2.1 | 2.2 | 1.1 |
| Diastolic blood pressure (mm.Hg). | Mean | 89 | 81 | 110 | 89 | 91 | 83 | 94 | 76 | 89 | 84 |
| | Standard deviation | 12.1 | 11.2 | 12.0 | 9.5 | 6.0 | 8.3 | 8.5 | 9.6 | 7.0 | 7.5 |
| | Standard error | 2.2 | 1.1 | 2.2 | 1.0 | 1.1 | 0.8 | 1.5 | 1.0 | 1.2 | 0.8 |
| Mean blood pressure (mm.Hg). | Mean | 124 | 113 | 125 | 99 | 109 | 103 | 118 | 93 | 112 | 106 |
| | Standard deviation | 12.4 | 14.4 | 11.5 | 9.9 | 5.5 | 8.7 | 8.9 | 14.1 | 7.7 | 8.0 |
| | Standard error | 2.2 | 1.5 | 2.1 | 1.0 | 1.0 | 0.9 | 1.6 | 1.4 | 1.4 | 0.8 |
| Comparison between control and trial periods (mm.Hg). | Systolic blood pressure | −22 | | −37 | | −5 | | −33 | | −7 | |
| | Diastolic blood pressure | −8 | | −21 | | −8 | | −18 | | −5 | |
| | Mean blood pressure | −11 | | −26 | | −6 | | −25 | | −6 | |
| Other antihypertensive. | | [3] H(100), TC-Th(6), R(0.6) | None | [4] R(0.6), H-Th (50) | H(50) | TC-Th(2) | TC-Th(2) | None | None | None | None |

[1] TC-Th; Trichlormethaizide.  [2] R; Reserpine.  [3] H; Hydralazine.  [4] H-Th; Hydrochlorothiazide.

TABLE VII

Hypotensive Responses in Hypertensive Patients Elicited by Administration of Calcium Salt: Comparison Between the Means of the Systolic and Diastolic Blood Pressures During the Control Period and Those During the Trial Period

| Depression of systolic blood pressure | Depression of diastolic blood pressure | | | | Total |
|---|---|---|---|---|---|
| | <5 mm.Hg | ≦5 mm.Hg | ≦10 mm.Hg | ≦15 mm.Hg | |
| <10 mm.Hg | 3 (No. 6, No. 2A [2], No. 3A [3]) | 3 (No. 2,[1] [3] No. 4B, No. 5B) | 0 | 0 | 6 |
| ≦10 mm.Hg | 0 | 0 | 1 (No. 3 [3]) | 0 | 1 |
| ≦20 mm.Hg | 1 (No. 1B [3]) | 1 (No. 3B) | 0 | 1 (No. 5 [3]) | 3 |
| ≦30 mm.Hg | 0 | 0 | 1 (No. 2B) | 5 (No. 1, No. 4 [3], No. 1A [3], No. 4A [3], No. 5A) | 6 |
| Total | 4 | 4 | 2 | 6 | 16 |

[1] Case No. 2 showed no difference between the means of systolic blood pressure during the control and trial periods.
[2] Case No. 2A showed no difference between the means of diastolic blood pressure during the control and trial periods.
[3] Cases, whom other antihypertensive drugs had been administered during the trial period.

TABLE VIII

Comparison Between the Means of the Systolic, Diastolic and Mean Blood Pressures Before, During and After Administration of Calcium Salt in Normotensive Subjects.

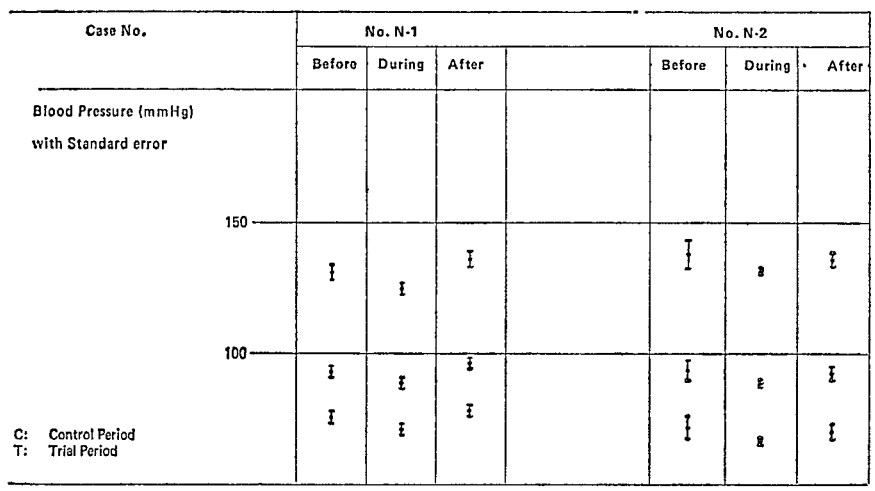

C: Control Period
T: Trial Period

TABLE IX

| | | | | | | | |
|---|---|---|---|---|---|---|---|
| Number of measurement | | 12 | 22 | 22 | 10 | 65 | 22 |
| Systolic blood pressure (mm. Hg). | Mean | 131 | 124 | 135 | 138 | 131 | 135 |
| | Standard deviation. | 8.2 | 8.1 | 8.9 | 10.4 | 8.3 | 9.0 |
| | Standard error | 2.4 | 1.7 | 1.9 | 3.3 | 1.0 | 1.9 |
| Diastolic blood pressure (mm. Hg) | Mean | 76 | 69 | 77 | 72 | 68 | 69 |
| | Standard deviation. | 5.3 | 7.0 | 7.9 | 7.8 | 6.9 | 6.4 |
| | Standard error | 1.5 | 1.5 | 1.7 | 2.5 | 0.9 | 1.4 |
| Number of measurement | | 12 | 22 | 22 | 10 | 65 | 22 |
| Mean blood pressure (mm. Hg). | Mean | 93 | 88 | 96 | 94 | 89 | 91 |
| | Standard deviation. | 5.5 | 6.3 | 7.5 | 8.1 | 6.4 | 6.6 |
| | Standard error | 1.6 | 1.3 | 1.6 | 2.6 | .08 | 1.4 |
| Comparison between control and trial periods (mm. Hg.). | Systolic blood pressure. | [1] −7 | | | | −7 | |
| | | [2] −11 | | | | −7 | |
| | Diastolic blood pressure. | −7 | | | | −4 | |
| | | −8 | | | | −1 | |
| | Mean blood pressure. | −5 | | | | −5 | |
| | | −8 | | | | −2 | |

[1] Difference between before and during Ca salt.
[2] Difference between after and during Ca salt.

TABLE X

Laboratory Findings Before and After Six Months' Administration of Calcium Salt

| Items, Case No. | Body weight (kg.) | Total protein (g./dl.) | Cholesterol (mg./dl.) | Blood chemistry GOT | GPT | ZST | A/G | Alkali- phos- phatase | LDH | BUN (mg./dl.) | Hb (g./dl.) | Red blood cell (/mm.³) (×10⁴) | White blood cells (/mm.³) | Protein | Urinalysis Sediment | Occult blood in feces (Guajac) | CTR in chest X-ray film | Electrocardiogram |
|---|---|---|---|---|---|---|---|---|---|---|---|---|---|---|---|---|---|---|
| No. 1 | | 7.0 | 138 | 11 | 0 | 9.6 | 0.77 | 6.0 | 228 | 25.2 | 11.9 | 370 | 11,650 | (±) | Few red blood cells | (±) | 51.0 | Left axis deviation the same as before. |
| No. 2 | | 8.0 | 166 | 36 | 21 | 7.3 | 1.13 | 8.4 | 255 | 38.0 | 10.8 | 370 | 8,400 | (±) | None | (±) | 52.0 | Within normal limits the same as before. |
| No. 3 | | 6.8 | 200 | 30 | 17 | 6.3 | 1.14 | 6.0 | 275 | 30.8 | 12.5 | 384 | 5,600 | (±) | Few red blood cells | (±) | 57.2 | |
| | | 8.7 | 261 | 19 | 10 | 7.7 | 1.24 | 9.4 | | 26.0 | 11.3 | 390 | 4,600 | (-) | None | (-) | 56.0 | LVH with LAD. |
| No. 4 | | 6.7 | 170 | 29 | 18 | 4.7 | 1.50 | 3.0 | 300 | 22.0 | 10.8 | 418 | 7,200 | (±) | do | (±) | 59.2 | LVH with LAD, SVEs. |
| | | 6.2 | 148 | 13 | 12 | 6.6 | 1.31 | 4.8 | 200 | 22.0 | 13.3 | 436 | 7,000 | (±) | do | (±) | | LVH, coronary insufficiency. |
| | 61.5 | 7.0 | 188 | 18 | 3 | | 1.13 | 4.5 | | 17.7 | 13.2 | 416 | 8,550 | (±) | do | (±) | 69.0 | 1st degree of A-V block the same as before. |
| | 63.5 | 7.2 | 210 | 17 | 6 | | 1.28 | | | 23.2 | 11.9 | 445 | 8,550 | (±) | do | (±) | 68.5 | |
| No. 5 | 30.5 | 7.0 | | 21 | 12 | | 0.88 | 4.4 | 230 | 33.4 | 13.9 | 328 | 5,650 | (±) | do | (±) | 45.9 | LVH and coronary insufficiency the same as before. |
| No. 6 | 33.0 | 6.1 | 232 | 17 | 12 | 4.2 | 1.42 | | | 16.4 | 11.7 | 389 | 5,300 | (+) | Few red blood cells | (-) | 65.5 | LVH. |
| | | 7.3 | 228 | 25 | 11 | 6.0 | 1.13 | 4.2 | | 22.0 | 10.2 | 342 | 4,450 | (±) | do | (±) | 56.5 | The same as before. |
| No. 1A | 39.0 | 6.7 | 206 | 11 | 3 | | 1.12 | 9.0 | 250 | 20.0 | 10.0 | 328 | 4,600 | (±) | None | (++) | 52.0 | LVH, myocardial infarction and SVEs the same as before. |
| | 33.0 | 8.5 | 170 | 18 | 13 | 5.2 | 1.00 | 4.6 | 98 | 28.0 | 12.1 | 392 | 5,650 | (+) | do | (±) | 59.0 | |
| No. 1B | 58.5 | 7.0 | 151 | 37 | 29 | | 1.00 | 5.8 | 169 | 35.0 | 12.1 | 381 | 7,000 | (±) | do | (±) | 54.0 | LVH and atrial fibrillation the same as before. |
| | | | | 24 | 17 | | | | | 16.3 | 15.4 | 436 | 7,100 | (±) | None | (-) | 55.8 | |
| No. 2A | 50.0 | 7.5 | 185 | 17 | 4 | | 1.12 | 7.0 | | 18.2 | 13.7 | 402 | 4,300 | (+) | do | (-) | 68.0 | L. |
| | 40.0 | 6.8 | 161 | 21 | 11 | 7.9 | 0.80 | 4.4 | | 10.8 | 14.2 | 398 | 8,300 | (±) | Few red blood cells | (±) | 62.2 | LVH and 1st degree of A-V block the same as before. |
| No. 2B | 43.5 | 6.8 | 150 | 28 | 10 | | 1.14 | 5.0 | | 21.8 | 11.3 | 331 | 5,100 | (±) | None | (±) | 65.0 | Myocardial ischemia. |
| No. 3A | 41.0 | 6.7 | 152 | 14 | 7 | 8.2 | 1.16 | | | 10.8 | 10.0 | 330 | 6,800 | (±) | do | (±) | 52.3 | Within normal limits. |
| | 37.0 | 8.6 | 210 | 17 | 10 | 11.3 | 1.0 | 8.4 | | 10.8 | 11.7 | 337 | 6,200 | (±) | do | (-) | 56.2 | LVH and ventricular extra systoles. |
| No. 3B | 39.5 | 7.8 | 186 | 15 | 11 | 9.6 | 0.76 | 8.0 | | 15.0 | 9.4 | 348 | 7,050 | (-) | do | (-) | 65.0 | LVH and RBBB. |
| | 32.5 | 7.4 | 168 | 20 | 14 | 8.0 | 1.32 | 6.0 | | 15.4 | 12.9 | 308 | 7,350 | (±) | do | (±) | 64.5 | LVH and myocardial ischemia. |
| No. 4A | 32.5 | 8.0 | 159 | 20 | 14 | 9.0 | 1.0 | 9.0 | | 20.6 | 10.2 | 314 | 4,300 | (±) | do | (±) | 68.5 | LVH and SVEs. |
| | 72.0 | 9.1 | 232 | 26 | 15 | 9.3 | 0.91 | 5.2 | | 18.2 | 14.2 | 399 | 8,600 | (±) | do | (±) | 64.0 | Myocardial ischemia and LAD. |
| No. 4B | 61.0 | 7.4 | 217 | 16 | 15 | 6.6 | 0.94 | 2.8 | 213 | 27.8 | 13.7 | 401 | 6,160 | (±) | do | (±) | 59.0 | 1st degree of A-V block. |
| | 63.0 | 7.0 | 173 | 19 | 15 | 3.7 | 1.0 | 8.0 | | 15.4 | 13.7 | 354 | 6,600 | (±) | Few red blood cells | (±) | 54.5 | LVH and myocardial ischemia. |
| No. 5A | 41.0 | 6.9 | 165 | 32 | 27 | | 1.14 | 7.0 | | 13.4 | 13.5 | 401 | 5,800 | (±) | do | (-) | 52.0 | LVH with slight ST depression. |
| | 42.0 | 7.9 | 264 | 13 | 7 | 6.0 | 1.42 | 7.6 | | 21.6 | 13.0 | 413 | 5,700 | (±) | do | (±) | 58.4 | LVH and IRBBB the same as before. |
| No. 5B | 48.0 | 6.6 | 296 | 101 | 36 | 5.7 | | 3.6 | | 12.2 | 11.5 | 311 | 8,600 | (±) | do | (++) | 61.0 | |
| | 44.0 | 8.3 | 262 | 16 | 8 | 9.6 | 1.42 | 7.2 | | 16.4 | 10.0 | 366 | 4,800 | (±) | None | (-) | 55.4 | Non-specific ST changes. |
| | | 6.2 | 210 | 14 | 8 | | 1.30 | | | 16.7 | 11.3 | 457 | 4,300 | | | | | |

See note at end of Table I.

RESULTS (1) In the first group of six hypertensive patients, a significant decrease in the means of the systolic, diastolic and mean blood pressures was demonstrated in five cases except one case (Case No. 2) during the trial period, compared with those during the control period. In one case (Case No. 2), the systolic, diastolic and mean blood pressures showed a decrease in their means, but the difference between the mean of the systolic blood pressure during the trial period and that during the control period was not significant by means of standard error method. This decrease in the blood pressures was noted, both in four cases (Case No. 2, Case No. 3, Case No. 4 and Case No. 5) who had been receiving the administration of the other antihypertensive drugs and in one case (Case No. 5) without the administration of any other antihypertensive drug. In another case (Case No. 1), thiazide derivatives were administered for the treatment of edema during the trial period (Table III and Table IV).

(2) In the second group of ten hypertensive patients, a significant decrease was demonstrated, the same as observed in the first group, in the means of the systolic, diastolic and mean blood pressures in nine cases except one case (Case No. 2A) during the trial period, compared with those during the control period. In one case (Case No. 2A), the difference between the means of the diastolic blood pressure during the control and trial periods was not significant, though the differences between the means of the systolic and mean blood pressures during these two periods were significant. This decrease in the blood pressures was noted in five cases (Case No. 1A, Case No. 1B, Case No. 3A, Case No. 4A and Case No. 4B), who had continued to receive the other antihypertensive drugs, in two cases (Case No. 2B and Case No. 3B), in whom the other antihypertensive drugs had been discontinued during the trial period and in three cases (Case No. 2A, Case No. 5A and Case No. 5B) without any other antihypertensive drug during both control and trial period respectively (Table V and Table VI).

(3) Fourteen cases out of sixteen hypertensive patients, when the patients of the first and the second group were totaled, showed a significant decrease in the means of both systolic and diastolic blood pressures during the trial period, compared with those during the control period. The means of the systolic and diastolic blood pressures showed a significant decrease in 15 out of 16 hypertensive patients respectively. The means of the mean blood pressure decreased in all 16 cases during the trial period, compared with those during the control period.

(4) The hypertensive responses of the hypertensive patients were classified according to the degrees of depression of both systolic and diastolic blood pressures. Thirteen cases out of 16 cases showed the decrease in the mean of the systolic blood pressure more than 10 mm. Hg and/or the decrease in the mean of the diastolic blood pressure more than 5 mm. Hg. Depression of the systolic blood pressure and that of the diastolic blood pressure were almost parallel in degrees (Table VII).

(5) The hypertensive effect of the calcium salt was examined in two normotensive patients. The means of the systolic, diastolic and mean blood pressures during the administration of this agent were significantly lower than those before administration and showed the tendencies to return to the pre-administration levels after cessation of the agent. The degrees of depression of these three pressures were more slight in the normotensive subjects than in the hypertensive patients (Table VIII and Table IX).

(6) The laboratory findings on the hypertensive patients before the six months' administration of calcium salt were examined (Table X). Serum total protein remained in normal range except one case (Case No. 2). In one case (Case No. 5A), GOT and GPT values were elevated after six months, whereas zinc sulfate test, alkaliphosphatase and lactic dehydrogenase remained within normal limits. Blood urea nitrogen increased in five cases higher above the normal range and returned within normal in four cases. Urinalysis and fecal occult blood examination revealed no remarkable changes.

We claim:

1. A therapeutic composition consisting essentially of a pharmaceutical carrier and as an active agent of hypotensive activity a member selected from the group consisting of calcium 5-butylpicolinate and calcium 5-pentylpicolinate, said agent being present in the amount of about 20 to 250 mg. per unit dose of said composition.

2. A therapeutic composition consisting essentially of a pharmaceutical carrier and as an active agent of hypotensive activity, calcium 5-pentylpicolinate, said agent being present in the amount of about 20 to 250 mg. per unit dose of said composition.

3. A therapeutic composition consisting essentially of a pharmaceutical carrier and as an active agent of hypotensive activity, calcium 5-butylpicolinate, said agent being present in an amount of about 20 to 250 mg. per unit dose of said composition.

References Cited

Chemical Abstracts, vol. 50:13920 c and g (1956).
Chemical Abstracts, vol. 45:2057i (1951).
Chemical Abstracts, vol. 52:18399a (1958).

ALBERT T. MEYERS, Primary Examiner

L. SCHENKMAN, Assistant Examiner

U.S. Cl. X.R.

260—295 R